United States Patent [19]

Birbara et al.

[11] Patent Number: 5,518,626

[45] Date of Patent: May 21, 1996

[54] PROCESS EMPLOYING THERMALLY STERILIZABLE AQUEOUS POLISHING AGENTS

[75] Inventors: Philip J. Birbara, Windsor Locks; Timothy A. Nalette, Tolland; Douglas A. Snowdon, Somers, all of Conn.

[73] Assignee: United Technologies Corporation, Hartford, Conn.

[21] Appl. No.: 173,634

[22] Filed: Dec. 23, 1993

[51] Int. Cl.$^6$ .................................................. C02F 9/00
[52] U.S. Cl. ........................... 210/670; 210/685; 210/694
[58] Field of Search ................................ 210/664, 668, 210/670, 673, 685, 686, 694, 764, 269, 274, 284

[56] References Cited

U.S. PATENT DOCUMENTS

| | | | |
|---|---|---|---|
| 3,420,709 | 1/1969 | Barrett et al. | 210/503 |
| 3,651,616 | 3/1972 | Blanchard et al. | 55/16 |
| 3,992,293 | 11/1976 | Sawicki et al. | 210/48 |
| 4,029,574 | 6/1977 | Reimann | 210/3 |
| 4,039,442 | 8/1977 | Kadlec et al. | 210/623 |
| 4,059,492 | 11/1977 | Hausweiler et al. | 203/11 |
| 4,160,725 | 7/1979 | Josis et al. | 210/21 |
| 4,202,737 | 5/1980 | Shimizu | 210/664 |
| 4,210,613 | 7/1980 | Webb | 261/120 |
| 4,265,642 | 5/1981 | Mir et al. | 55/85 |
| 4,297,220 | 10/1981 | Meitzner et al. | 210/690 |
| 4,342,730 | 8/1982 | Perrotta | 423/215.5 |
| 4,378,235 | 3/1983 | Cosper et al. | 55/85 |
| 4,397,743 | 8/1983 | Green et al. | 210/735 |
| 4,410,503 | 10/1983 | Van Nassua et al. | 423/359 |
| 4,456,535 | 6/1984 | Zuidam et al. | 210/750 |
| 4,517,094 | 5/1985 | Beall | 210/664 |
| 4,518,503 | 5/1985 | Fermaglich | 210/662 |
| 4,526,692 | 7/1985 | Yohe et al. | 210/747 |
| 4,544,488 | 10/1985 | O'Brien | 210/664 |
| 4,547,293 | 10/1985 | King et al. | 210/638 |
| 4,582,610 | 4/1986 | Baker | 210/747 |
| 4,597,833 | 7/1986 | Neel et al. | 203/49 |
| 4,608,163 | 8/1986 | Yohe et al. | 210/150 |
| 4,746,438 | 5/1988 | Riggs, Jr. | 210/664 |
| 4,808,287 | 2/1989 | Hark | 204/182.5 |
| 4,842,748 | 6/1989 | Agnihotri et al. | 210/774 |
| 4,844,805 | 7/1989 | Solomon | 210/321.82 |
| 4,846,934 | 7/1989 | Carberry | 202/177 |
| 4,857,198 | 8/1989 | Meidl | 210/603 |
| 4,871,450 | 10/1989 | Goodrich et al. | 210/151 |
| 4,879,041 | 11/1989 | Kurokawa et al. | 210/640 |
| 4,890,673 | 1/1990 | Payne | 166/266 |

(List continued on next page.)

FOREIGN PATENT DOCUMENTS

| | | |
|---|---|---|
| 1260861 | 4/1961 | France . |
| 1934000 | 1/1971 | Germany . |
| 50-083274 | 7/1975 | Japan . |
| 61-042395 | 2/1986 | Japan . |
| 63-097286 | 4/1988 | Japan . |
| 03000186 | 1/1991 | Japan . |

OTHER PUBLICATIONS

Derwent Publications Ltd., London, G.B. (Database WPI) (Week 7648) An 76–89263X.

Patent Abstracts of Japan, vol. 10, No. 199 (C–359) Jul. 11, 1986.

Patent Abstracts of Japan, vol. 15, No. 104 (C–0814) Mar. 31, 1991.

Patent Abstracts of Japan, vol. 12, No. 338 (C–527) Sep. 12, 1988.

Primary Examiner—Ivars Cintins
Attorney, Agent, or Firm—Mary R. Bonzagni; Holland & Bonzagni

[57] ABSTRACT

The present invention provides a system and a process for removing contaminants such as $CO_2$ and mobile cations and anions from aqueous solutions. The system and the process contemplate the use of thermally sterilizable aqueous polishing agents such as thermally sterilizable ion exchange resins and as a result, the need for chemical and/or mechanical microbial control or inhibition techniques is obviated. Therefore, the present invention will be especially useful in submarine and spacecraft applications where the need exists for reduced weight and volume water processing systems.

9 Claims, 1 Drawing Sheet

U.S. PATENT DOCUMENTS

| | | | |
|---|---|---|---|
| 4,902,422 | 2/1990 | Pinnau et al. | 210/500.23 |
| 4,945,988 | 8/1990 | Payne et al. | 166/266 |
| 4,950,394 | 8/1990 | Bernhardt et al. | 210/170 |
| 4,954,258 | 9/1990 | Little | 210/611 |
| 4,960,520 | 10/1990 | Semmens | 210/640 |
| 4,966,096 | 10/1990 | Adey | 119/3 |
| 4,980,101 | 12/1990 | Beck et al. | 264/41 |
| 4,997,571 | 3/1991 | Roensch et al. | 210/698 |
| 5,004,484 | 4/1991 | Stirling et al. | 55/53 |
| 5,013,339 | 5/1991 | Mahoney et al. | 55/158 |
| 5,015,275 | 5/1991 | Beck et al. | 55/158 |
| 5,018,576 | 5/1991 | Udell et al. | 166/272 |
| 5,022,996 | 6/1991 | McCaffrey et al. | 210/654 |
| 5,030,356 | 7/1991 | Blume et al. | 210/640 |
| 5,045,214 | 9/1991 | Walker | 210/717 |
| 5,067,852 | 11/1991 | Plunkett | 405/128 |
| 5,069,796 | 12/1991 | Fox | 210/664 |
| 5,097,795 | 3/1992 | Adey | 119/3 |
| 5,106,507 | 4/1992 | Von Klock et al. | 210/664 |
| 5,116,515 | 5/1992 | Selesnick | 210/744 |
| 5,122,166 | 6/1992 | Hyrcyk et al. | 55/38 |
| 5,151,194 | 9/1992 | Simpson et al. | 210/680 |
| 5,190,665 | 3/1993 | Titmas et al. | 210/743 |
| 5,236,590 | 8/1993 | Sciamanna et al. | 210/639 |
| 5,244,478 | 9/1993 | Jolly | 95/46 |

PROCESS EMPLOYING THERMALLY STERILIZABLE AQUEOUS POLISHING AGENTS

FIELD OF THE INVENTION

The present invention relates to aqueous polishing agents that remain stable upon multiple exposures to steam sterilization conditions and further relates to a system and to a process employing such thermally sterilizable polishing agents.

BACKGROUND OF THE INVENTION

In closed environments, such as those found in submarines and spacecraft, the control of microbial agents has always been a primary concern. This concern is particularly significant in water treatment systems that remove various inorganic substances, ions, organic substances and microorganisms from water so as to render the water ultrapure or potable. The effectiveness of such systems is dependent upon not only the ability of the system to consistently remove contaminants in the water that approach or exceed "acceptable levels" but also the ability of the system not to become contaminated with microbial agents in the process.

The use of ion exchange resins with considerable variations in acid and base strength in water treatment systems is known. Such resin dependent systems generally operate under moderate temperature and pressure conditions where the resins employed are not all stable at elevated temperatures. In particular, strong and weak base anionic resins typically degrade at temperatures approaching 60° C. Strong and weak acid cationic resins are more thermally stable and typically degrade at temperatures approaching 121° C. to 149° C. Although a few weak base anionic resins have been identified as stable at elevated temperatures these resins are not the most viable candidates for use in water treatment systems where they do not demonstrate a high capacity for anions.

The general type of water treatment system utilizing resins is dependent upon the feed water source (i.e., pretreated or untreated water supplies). Such systems typically employ multiple ion exchange resin beds, with each bed targeting specific water contaminants. In multiple bed systems that process untreated water select "polishing" resin beds are typically located after a two or three bed treatment configuration for removal of trace amounts of contaminants that may still be present in the effluent from the upstream resin beds. In multiple bed systems that process treated water such "polishing" resin beds would define or make up the system.

It has been observed in water treatment systems that utilize ion exchange resin beds or activated carbon beds that bacteria tends to collect and grow within the beds. Prior art techniques aimed towards inhibiting the growth of bacteria within ion exchange resin beds involve the addition of bacteriostatic chemicals like iodine and iodine compounds to the beds or periodic back flushing of the beds. Yet such control or inhibition techniques result in high resupply weight and/or volume penalties in submarine and spacecraft applications.

It is therefore an object of the present invention to provide thermally sterilizable polishing agents that enable the control and maintenance of a microbial free environment.

It is a further object of the present invention to provide thermally sterilizable polishing agents that serve to obviate the need for chemical or mechanical microbial control or inhibition techniques.

It is still a further object of the present invention to provide a process for removing contaminates from an aqueous solution that utilizes such thermally sterilizable polishing agents.

It is yet a further object to provide a system for removing contaminants from an aqueous solution that utilizes such thermally sterilizable polishing agents.

SUMMARY OF THE INVENTION

The present invention therefore provides a process for removing contaminants such as $CO_2$ and mobile cations and anions from an aqueous solution that utilizes thermally sterilizable polishing agents such as thermally sterilizable ion exchange resins and optionally thermally sterilizable sorbents, which comprises the steps of: (a) passing the solution through a cation exchange resin bed, at least once, for adsorption of mobile cations, where the resin bed comprises a thermally sterilizable cation exchange resin; (b) passing the solution through an anion exchange resin bed, at least once, for adsorption of $CO_2$ and mobile anions, where the resin bed comprises a thermally sterilizable anion exchange resin; (c) regenerating the polishing agents for desorption of adsorbed contaminants; (d) optionally repeating steps (a) through (c) at least once; and (e) thermally sterilizing the polishing agents so as to destroy all forms of microbial life on or in the polishing agents. The inventive process can further comprise the step of passing the aqueous solution through a sorbent bed, at least once, for adsorption of non-ionizing organic contaminants, where the sorbent bed comprises a thermally sterilizable sorbent.

The present invention further provides a system for removing contaminants such as $CO_2$ and mobile cations and anions from an aqueous solution that utilizes thermally sterilizable polishing agents such as thermally sterilizable ion exchange resins and optionally thermally sterilizable sorbents, which comprises: (a) a flow through cation exchange resin bed through which the aqueous solution is passed, where the resin bed comprises a thermally sterilizable cation exchange resin for adsorbing mobile cations from the solution; (b) a flow through anion exchange resin bed through which the aqueous solution is passed where the resin bed comprises a thermally sterilizable anion exchange resin for adsorbing $CO_2$ and mobile anions from the solution; (c) a means for regenerating the polishing agents for desorption of adsorbed contaminants; and (d) a means for thermally sterilizing the polishing agents. The inventive system can further comprise a flow through sorbent bed through which the solution is passed, where the sorbent bed comprises a thermally sterilizable sorbent for adsorbing non-ionizing organic contaminants.

DESCRIPTION OF THE PREFERRED EMBODIMENT

Figure 1:
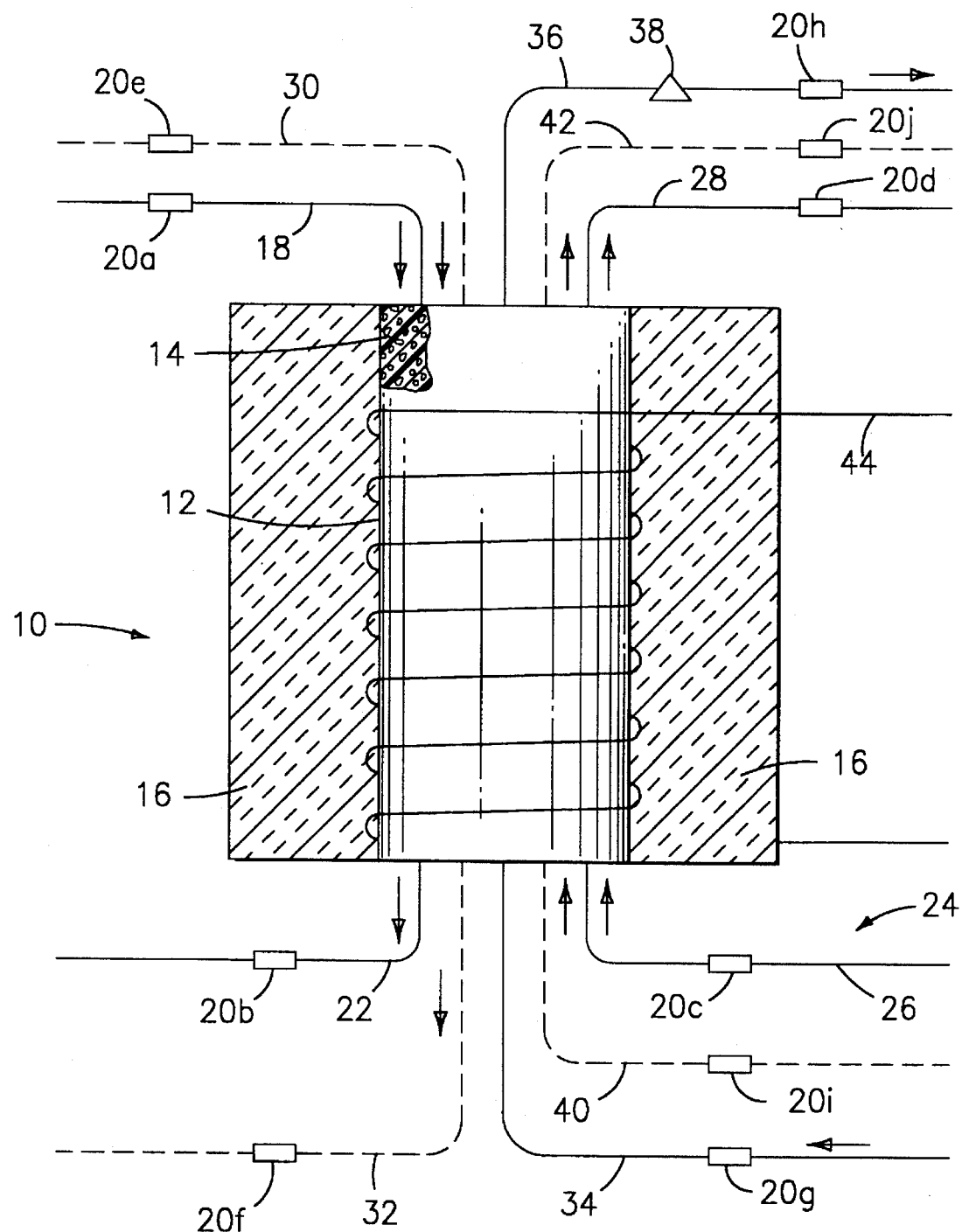
FIG. 1 shows a representative unit of the present inventive system for removing contaminants from an aqueous solution that utilizes thermally sterilizable polishing agents.

The cation exchange resin of the present invention can be any thermally sterilizable cation exchange resin capable of removing cation contaminants such as alkaline earth metal cation contaminants from aqueous solutions. Such resins must remain stable for prolonged periods at temperatures approaching 121° C. and must have a high capacity for cations. In particular, the cation exchange resins of the present invention must be capable of withstanding high temperatures for sufficient time periods necessary to destroy all forms of microbial life on or within the resin and, as such, embody a feature that is extremely important in any water treatment process. For purposes of the present invention, the term "a high capacity for cations" is intended to mean a volumetric total cation exchange capacity of at least about 1.0 milliequivalent(meq)/millimeter(ml), as measured by standard wet chemistry titration methods and a weight total cation exchange capacity of at least about 4.0 meq/gram(g) of dry resin.

Preferred cation exchange resins are strong acid cation exchange resins made by copolymerizing styrene with divinylbenzene and/or vinylethylbenzene and have sulfonic, carboxylic, phosphonic and/or phosphinic acid functionality. Included among these preferred resins are cation exchange resins available from Rohm and Haas Company, Philadelphia, Pa. and Dow Chemical Co., Midland, Mich. and sold under the trademarks Amberlite® and Dowex®, respectively.

The most preferred cation exchange resin is Amberlite® 200, a sulfonic acid functionalized styrene divinylbenzene copolymer available from Rohm and Haas Company. The volumetric total cation exchange capacity of this resin is about 1.7 meq/ml.

Due to the strong associations that result between the resin and adsorbed cations such resins are not thermally regenerable. It is therefore preferred that the cation exchange resin of the present invention be regenerated by chemical means such as by acid washing. In particular, it is preferred that 1% to 5% sulfuric acid ($H_2SO_4$) or 4% to 10% hydrochloric acid (HCl) solutions be utilized as regenerants. As is well known in the art, suppliers of ion exchange resins typically recommend specific acid solutions as regenerants for each supplied resin. It is further preferred that such acid solutions be passed through the cation exchange resin bed at a flow rate of from about 0.50 to about 0.75 gallons per minute per cubic foot of resin bed volume.

The anion exchange resin of the present invention can be any thermally sterilizable anion exchange resin capable of removing $CO_2$ and anion contaminants such as $OH^-$, $Cl^-$, $HCO_3^-$, $CO_3^{-2}$, $SO_4^{-2}$, etc. from aqueous solutions. These resins must remain stable for prolonged periods at temperatures approaching 121° C. and must have a high capacity for anions. As discussed hereinabove, the resin must be capable of withstanding high temperatures for sufficient time periods necessary to destroy all forms of microbial life. For purposes of the present invention, the term "a high capacity for anions" is intended to mean a volumetric total anion exchange capacity of at least about 1.0 meq/ml, as measured by standard wet chemistry titration methods and a weight total anion exchange capacity of at least about 4.0 meq/g of dry resin.

Preferred anion exchange resins are made by copolymerizing styrene with divinylbenzene and/or vinylethylbenzene and contain amine functionality. In addition, these preferred resins have porous structures and are therefore able to efficiently adsorb and desorb large organic ions. Included among these preferred resins are anion exchange resins available from Mitsubishi Kasei America, Inc., White Plains, N.Y. and sold under the trademarks DIAION WA20 and DIAION WA21. DIAION WA20 and DIAION WA21 are porous and high porous type weak base anion exchange resins in the OH ionic form based on the copolymer of styrene and divinylbenzene, respectively. The volumetric total ion exchange capacity of these resins is about 2.5 meq/ml (WA20) and about 2.0 meq/ml (WA21). The structure of the DIAION WA20 and WA21 resins is as follows:

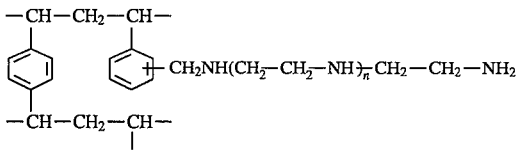

where n=1 to 3.

The most preferred anion exchange resin is DIAION WA21, a high porous type weak base anion exchange resin available from Mitsubishi Kasei.

Although the anion exchange resin of the present invention can be thermally regenerated for desorption of $CO_2$ and $CO_2$ ionic species (i.e., $HCO_3^-$ and $CO_3^{-2}$) other adsorbed anions are not susceptible to such a regeneration process. It is therefore preferred that the anion exchange resin be regenerated by chemical means such as by alkaline washing. In particular, it is preferred that a 3% to 10% sodium hydroxide (NaOH) solution be utilized as a regenerant. It is further preferred that the regenerant solution be passed through the anion exchange resin bed at a flow rate of from about 0.50 to about 1.0 gallons per minute per cubic foot of resin bed volume.

The sorbent of the present invention can be any thermally sterilizable sorbent capable of removing non-ionizing organic contaminants from aqueous solutions. The sorbent of the present invention must also be capable of maintaining physical and chemical integrity upon prolonged exposures to temperatures approaching 121° C. In particular, the sorbent of the present invention may be a carbon based sorbent or an organic polymer based sorbent or a mixture of such sorbents.

Preferred carbon based sorbents include high purity activated carbons and synthetic carbonaceous adsorbents having surface areas greater than about 100 meters$(m)^2$/g and, more preferably, having surface areas greater than about 500 $m^2$/g. The most preferred carbon based sorbents are available from Rohm and Haas Company and are sold under the trademark Ambersorb® carbonaceous adsorbents. Preferred organic polymer based sorbents include aromatic sorbents such as polystyrene based sorbents and aliphatic sorbents such as acrylic ester based sorbents having surface areas greater than about 100 $m^2$/g. Such organic polymer based sorbents are available from Rohm and Haas Company and are sold under the trademark Amberlite® "XAD" polymeric adsorbents.

When the sorbent of the present invention becomes saturated with adsorbed impurities it is preferred that the sorbent be replaced. Although such sorbents can be regenerated for desorption of volatile organics, such regeneration techniques do not result in the desorption of large or nonvolatile organics. Therefore, sorbent regeneration is not preferred.

The preferred process and system described herein are not intended to be exhaustive or to limit the invention to the precise steps or form disclosed. They are chosen and described to illustrate the principles of the invention so that others skilled in the art may utilize its teachings.

The preferred system for removal of contaminants from an aqueous solution of the present invention comprises at least one cation exchange resin bed, at least one anion exchange resin bed, means for regenerating the resins and means for thermally sterilizing the resins. The more preferred system of the present invention comprises at least one sorbent bed and means for thermally sterilizing the sorbent in addition to the above-referenced system components.

Referring to FIG. 1, reference numeral 10 generally designates a representative unit of the system of the present invention. Representative unit 10 conveniently takes the form of a column 12 that is packed with either a thermally sterilizable cation exchange resin 14, a thermally sterilizable anion exchange resin or a thermally sterilizable sorbent. As is well known in the art, beds targeting the same contaminants are typically arranged and operated in parallel, while beds targeting different contaminants are typically arranged and operated in series within a water treatment system. For ease of reference, only a column packed with the thermally sterilizable cation exchange resin 14 will be discussed where such a discussion equally relates to columns packed with the above-described anion exchange resins and sorbents. Where such a discussion does not so equally relate to each packed column type, differences will be so noted. Although mixed columns or beds are contemplated by the present invention, such beds would not be regenerable and therefore are not preferred. Packed column 12 is wrapped in any suitable insulation material 16 and is provided with an inlet 18, having a valve means 20a, to receive an influent containing contaminants such as $CO_2$ and mobile cations and anions and with an outlet 22, also having a valve means 20b, to receive an effluent free from mobile cations from packed column 12.

Column 12 is further provided with a means 24 for regenerating resin 14, which may take the form of a regenerant inlet 26, having a valve means 20c, and an outlet 28, also having a valve means 20d, for receiving regenerant containing desorbed contaminants. For columns packed with the above-described sorbents, means for regenerating the sorbents are not employed.

Column 12 is further provided with a means for thermally sterilizing resin 14, which may take the form of a purge gas inlet 30, having a valve means 20e, and an outlet 32, also having a valve means 20f, to receive air, water and purge gas. In addition, the sterilization means may further take the form of a steam inlet 34, having a valve means 20g, and a steam outlet 36, having a back pressure regulator 38, and a valve means 20h. Moreover, the sterilization means may take the form of a demineralized water inlet 40, having a valve means 20i, and an outlet 42, also having a valve means 20j. The sterilization means may further take the form of a guard heater 44 in the form of a coil wrapped around the full height of packed column 12 for assuring the maintenance of sterilization temperatures during each sterilization step or cycle. Arrows on the inlet and outlet lines designate the direction of flow.

In operation, at least three process cycles are employed on each unit comprising resin packed columns—namely, an adsorption cycle, a desorption or regeneration cycle and a sterilization cycle.

During the adsorption cycle, valve means 20a and 20b are opened, valve means 20c–j are closed and an aqueous stream containing contaminants such as $CO_2$ and mobile cations and anions is introduced through inlet 18 to packed column 12 containing the thermally sterilizable cation exchange resin 14. Within packed column 12, the aqueous stream intimately contacts resin 14, enabling the adsorption of mobile cations. As is well known in the art, influent flow rates and resin and/or sorbent column or bed residence times are determined based upon the concentration of target contaminants present in the influent stream and the removal capabilities of the particular resin or sorbent employed. Water, free from mobile cations, exits packed column 12 through outlet 22. As is also well known in the art, monitoring of the effluent streams contaminant concentrations will enable early detection of the resins' or sorbent's diminished adsorption capacity(ies) and therefore the need to regenerate the resin(s) and/or replace the sorbent.

During the desorption or regeneration cycle, valve means 20a and 20b are closed and valve means 20c and 20d are opened. Means 24 for regenerating resin 14 for desorption of adsorbed cations is then employed. It is preferred that a regenerant solution such as 1% to 5% $H_2SO_4$ or 4% to 10% HCl be introduced into regenerant inlet 26 and passed through packed column 12 at a flow rate of from about 0.50 to about 0.75 gallons per minute per cubic foot of column 12 volume. It is further preferred that the regenerant solution be passed through packed column 12 at the preferred flow rate for about 10 to about 50 minutes. For columns packed with the above-described anion exchange resin, it is preferred that a regenerant solution such as 3% to 10% NaOH be passed through the column at a flow rate of from about 0.50 to about 1.0 gallons per minute per cubic foot of resin column or bed volume for about 10 to about 22 minutes. For sorbent columns or beds, it is preferred that the sorbent be replaced with virgin or unspent sorbent once the sorbents removal capabilities have diminished. Once the $H_2SO_4$ or HCl regenerant solution contacts resin 14, contained in packed column 12, adsorbed cationic species are drawn into the regenerant solution thereby restoring resin 14's cation adsorption capacity. Regenerant solution containing desorbed cationic species exits packed column 12 through outlet 28.

During the sterilization cycle which may follow each desorption or regeneration cycle or which may be performed on an "as needed" basis, means for thermally sterilizing the resins and sorbent for destroying microbial life are employed. The term sterilization is defined as the total absence of living organisms. It is preferred that the resins and sorbent be sterilized by either dry-heat or steam sterilization with steam sterilization being the most preferred sterilization technique.

Dry-heat sterilization is generally conducted at from about 160° C. to about 170° C. for greater than or equal to two hours. At considerably higher temperatures, the required exposure times are much shorter. Forced-air type ovens are usually recommended for better temperature distribution.

Steam sterilization is sterilization by moist heat. It cannot be considered adequate without assurance that complete steam penetration takes place to all surfaces of the resin or sorbent to be sterilized. The critical parameters of steam sterilization are temperature, time, air elimination, steam quality and the absence of superheating.

Steam sterilization at 100° C. and atmospheric pressure is not considered effective. To be effective, steam sterilization should be carried out under higher pressure using saturated steam. Although the temperature can be as low as 115° C., it is preferred that the temperature be 121° C. or higher.

The success of steam sterilization is dependent on direct steam contact which can be prevented by the presence of air in the resin or sorbent column or bed. Where the ability of steam to heat a surface to a given temperature is considerably reduced by the presence of air, air elimination is regarded as an absolute parameter.

The term steam quality refers to the amount of dry steam present relative to liquid water (in the form of droplets). Excessive amounts of water can result in drying problems following exposure, and greater than 3% water or less than 97% quality steam is considered unacceptable.

Superheated steam results when steam is heated to a temperature higher than that which would produce saturated steam. As a result, the equilibrium between liquid and vapor is destroyed, and the steam behaves as a gas. In particular, it loses its ability to condense into moisture when in contact with the cooler surface of the article (e.g., resin, sorbent) to be sterilized.

Those skilled in the art will recognize that the selection of an appropriate "steam sterilization cycle" must be made after a careful study of the nature of the resin or sorbent to be sterilized and the type and number of organisms present.

In a preferred steam sterilization cycle, valve means 20c and 20d are closed, valve means 20e and 20f are opened and a purge gas (i.e., nitrogen, argon, etc.) is introduced through purge gas inlet 30 into packed column 12. The flow of purge gas through packed column 12 tends to minimize or reduce the amount of free water present in column 12. It is preferred that the purge gas be introduced into purge gas inlet 30 and passed through column 12 at a flow of about 2 to 5 bed volumes, prior to the introduction of steam to packed column 12. Purge gas and water exit through outlet 32. Valve means 20e and 20f are then closed and valve means 20g and 20h opened. Steam at a minimum gage pressure of 15 psi, having a steam quality of 100%, and at a temperature of about 121° C. is introduced into steam inlet 34 and then passed through packed column 12 for a period of time sufficient to displace any air present in column 12 with steam. Valve means 20h is then closed and steam is allowed to fill column 12. Valve means 20g is then closed and the steam maintained within column 12 for from about 10 to about 30 minutes, which represents the time required for complete penetration. This includes the heat-up time as well as exposure time. Valve means 20h is then opened and the pressure is relieved, by allowing the steam to exit through outlet 36. Back pressure regulator 38 controls the flow rate of the steam exiting column 12. Valve means 20h is then closed and valve means 20i and 20j opened. Demineralized water is then introduced into demineralized water inlet 40 and passed through packed column 12. The flow of demineralized water through packed column 12 serves to cool resin 14 and to purge any trapped gas. It is preferred that the demineralized water be introduced into inlet 40 and passed through packed column 12 at a flow rate of from about 0.50 to about 1.0 gallons per minute per cubic foot of packed column 12 volume for about 25 to about 50 minutes. Heated demineralized water and gas exits column 12 through outlet 42. At the end of the steam sterilization cycle, valve means 20i and 20j are closed.

In a more preferred steam sterilization cycle, purge gas is passed through packed column 12 as described above. Valve means 20e and 20f are then closed and valve means 20g and 20h opened. Steam, at a minimum gage pressure of 15 psi, having a steam quality of 100% and at a temperature of about 121° C. is introduced into steam inlet 34 and passed through column 12. Steam continues to be passed through column 12 for about 10 to about 30 minutes after resin 14 has reached a temperature of about 121° C. During the period of time that steam is being passed through column 12, guard heater 44 is activated and brought to a temperature of from about 121° C. to about 135° C., thereby assuring the maintenance of sterilization temperatures during the sterilization cycle. Valve means 20g and 20h are then closed, guard heater 44 deactivated and valve means 20i and 20j opened. Demineralized water is then introduced into packed column 12 as described above. At the end of the steam sterilization cycle, valve means 20i and 20j are closed.

Although this invention has been shown and described with respect to the detailed embodiments thereof, it will be understood by those skilled in the art that various changes in form and detail thereof may be made without departing from the spirit and scope of the claimed invention.

Having thus described the invention, what is claimed is:

1. A process for removing contaminants from an aqueous solution, which comprises:
   a. passing said solution through a cation exchange resin bed at least once for adsorption of mobile cations, wherein said resin bed comprises a thermally sterilizable cation exchange resin;
   b. passing said solution through an anion exchange resin bed at least once for adsorption of $CO_2$ and mobile anions, wherein said resin bed comprises a thermally sterilizable anion exchange resin of the formula

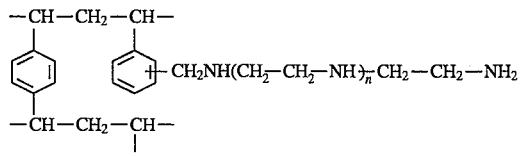

wherein n=1 to 3;
   c. regenerating said cation exchange resin for desorption of adsorbed mobile cations;
   d. regenerating said anion exchange resin for desorption of adsorbed $CO_2$ and mobile anions;
   e. optionally repeating steps (a) through (d) at least once; and
   f. thermally sterilizing said resins for destroying all forms of microbial life on or in said resins.

2. A process for removing contaminants from an aqueous solution, which comprises:
   a. passing said solution through a cation exchange resin bed at least once for adsorption of mobile cations, wherein said resin bed comprises a thermally sterilizable cation exchange resin;
   b. passing said solution through an anion exchange resin bed at least once for adsorption of $CO_2$ and mobile anions, wherein said resin bed comprises a thermally sterilizable anion exchange resin of the formula

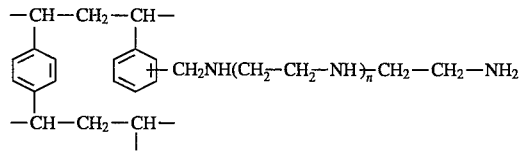

where n=1 to 3;
   c. passing said solution through a sorbent bed at least once for adsorption of non-ionizing organic compounds, wherein said sorbent bed comprises a thermally sterilizable sorbent;
   d. regenerating said cation exchange resin for desorption of adsorbed mobile cations;
   e. regenerating said anion exchange resin for desorption of adsorbed $CO_2$ and mobile anions;
   f. replacing said sorbent with virgin or unspent sorbent;
   g. optionally repeating steps (a) through (f) at least once; and
   h. thermally sterilizing said resins and said sorbent for destroying all forms of microbial life on or in said resins and said sorbent.

3. The process of claims 1 or 2, wherein said cation exchange resin is selected from the group consisting of acid functionalized styrene divinylbenzene copolymers and acid functionalized styrene vinylethylbenzene copolymers and wherein said acid functional group is selected from the group consisting of sulfonic, carboxylic, phosphonic and phosphinic acids.

4. The process of claim 3, wherein said cation exchange resin is a sulfonic acid functionalized styrene divinylbenzene copolymer and wherein said resin has a volumetric total cation exchange capacity of at least about 1.0 meq/ml.

5. The process of claims 1 or 2, wherein said anion exchange resin has a volumetric total anion exchange capacity of at least about 1.0 meq/ml.

6. The process of claim 2, wherein said sorbent is selected from the group consisting of carbon based sorbents and organic polymer based sorbents and mixtures thereof.

7. The process of claim 6, wherein said sorbent is a carbon based sorbent having a surface area of greater than about 100 $m^2/g$.

8. The process of claim 1, wherein said resins are thermally sterilized with steam at a temperature of at least about 121° C., having a steam quality of at least 97% in the absence of air, for about 15 to about 25 minutes.

9. The process of claim 2, wherein said resins and said sorbent are thermally sterilized with steam at a temperature of at least about 121° C., having a steam quality of at least 97%, in the absence of air, for about 15 to about 25 minutes.

\* \* \* \* \*